United States Patent
Anderson et al.

(10) Patent No.: US 10,427,484 B2
(45) Date of Patent: Oct. 1, 2019

(54) VEHICLE SUSPENSION SUPPORT

(71) Applicant: Ford Global Technologies, LLC, Dearborn, MI (US)

(72) Inventors: Brett Anderson, Canton, MI (US); Jeffrey Lipa, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 104 days.

(21) Appl. No.: 15/612,477

(22) Filed: Jun. 2, 2017

(65) Prior Publication Data
US 2018/0345746 A1    Dec. 6, 2018

(51) Int. Cl.
*B60G 15/06*    (2006.01)

(52) U.S. Cl.
CPC ......... *B60G 15/067* (2013.01); *B60G 15/068* (2013.01); *B60G 2202/312* (2013.01); *B60G 2204/128* (2013.01); *B60G 2204/41* (2013.01); *B60G 2204/418* (2013.01); *B60G 2204/45021* (2013.01); *B60G 2206/91* (2013.01)

(58) Field of Classification Search
CPC ............ B60G 15/067; B60G 2204/418; B60G 2204/128
See application file for complete search history.

(56) References Cited

U.S. PATENT DOCUMENTS

| 5,000,429 A | 3/1991 | Willmar et al. | |
|---|---|---|---|
| 6,161,822 A * | 12/2000 | Hurst | B60G 13/003 188/321.11 |
| 6,296,237 B1 * | 10/2001 | Nagai | B60G 7/04 267/140 |
| 7,032,912 B2 * | 4/2006 | Nicot | B60G 17/04 267/267 |
| 7,347,414 B2 | 3/2008 | Groves | |
| 7,938,418 B1 * | 5/2011 | Coombs | B60G 15/068 267/220 |
| 8,109,492 B2 | 2/2012 | Winocur | |
| 8,348,029 B2 | 1/2013 | Winocur | |
| 2002/0121793 A1 * | 9/2002 | Rice | B60G 99/004 296/35.1 |
| 2003/0209395 A1 * | 11/2003 | Fukaya | B60G 11/14 188/322.12 |
| 2004/0100057 A1 * | 5/2004 | Nicot | B60G 17/019 280/93.5 |
| 2007/0144850 A1 | 6/2007 | Hattori | |
| 2009/0085266 A1 | 4/2009 | Kim | |
| 2009/0315292 A1 * | 12/2009 | Winocur | B60G 15/068 280/124.146 |
| 2012/0049428 A1 * | 3/2012 | Moore | B60G 15/068 267/220 |
| 2013/0328255 A1 * | 12/2013 | Geisler | F16F 9/54 267/220 |
| 2014/0239567 A1 * | 8/2014 | Suchta | B60G 15/061 267/220 |

FOREIGN PATENT DOCUMENTS

KR    20130005358    1/2013

* cited by examiner

*Primary Examiner* — Darlene P Condra
(74) *Attorney, Agent, or Firm* — Ray Coppiellie, Esq.; Hanley, Flight & Zimmerman, LLC

(57) ABSTRACT

A vehicle suspension support includes a housing including an opening to receive an upper end of a damper and a top mount bushing fixed to an upper surface of the housing, the top mount bushing having an aperture aligned with the opening.

20 Claims, 7 Drawing Sheets

VEHICLE SUSPENSION SUPPORT

FIELD OF THE DISCLOSURE

This disclosure relates generally to vehicle suspensions and, more particularly, to suspension supports for struts or shock absorbers.

BACKGROUND

A vehicle suspension includes a tire, a spring, and a damper, such as a shock absorber or a strut. A front damper may be mounted, for example, between a lower control arm and the chassis, via a damper tower. For instance, a front shock absorber or a front strut may be mounted between a lower control arm and the chassis via a shock absorber tower or a strut tower, respectively.

SUMMARY

In one example, a vehicle suspension support includes a housing including an opening to receive an upper end of a damper and a top mount bushing fixed to an upper surface of the housing, the top mount bushing having an aperture aligned with the opening.

In another example, an apparatus includes a chassis portion to receive an upper end of a damper via an opening defined in a bottom portion of the chassis portion, a top mount bushing fixed within the chassis portion, the top mount bushing having an aperture aligned with the opening and a connector to connect the chassis portion to a vehicle suspension support.

In yet another example, a method of assembling a vehicle suspension includes installing a top mount bushing on a first side of a housing, the top mount bushing including a bearing plate defining an aperture aligned with a first opening in the housing, disposing a damper on a second side of the housing opposite the first side, passing an upper end of the damper through the first opening and the aperture and connecting the upper end of the damper to the load bearing plate.

The figures are not to scale. While the present disclosure is susceptible to various modifications and alternative forms, specific examples are shown and described herein. It should be understood, that the present disclosure is not limited to the particular forms and examples disclosed and instead covers all modifications, equivalents, embodiments, and alternatives falling within the spirit and scope of the present disclosure.

DETAILED DESCRIPTION

Figure 1A:
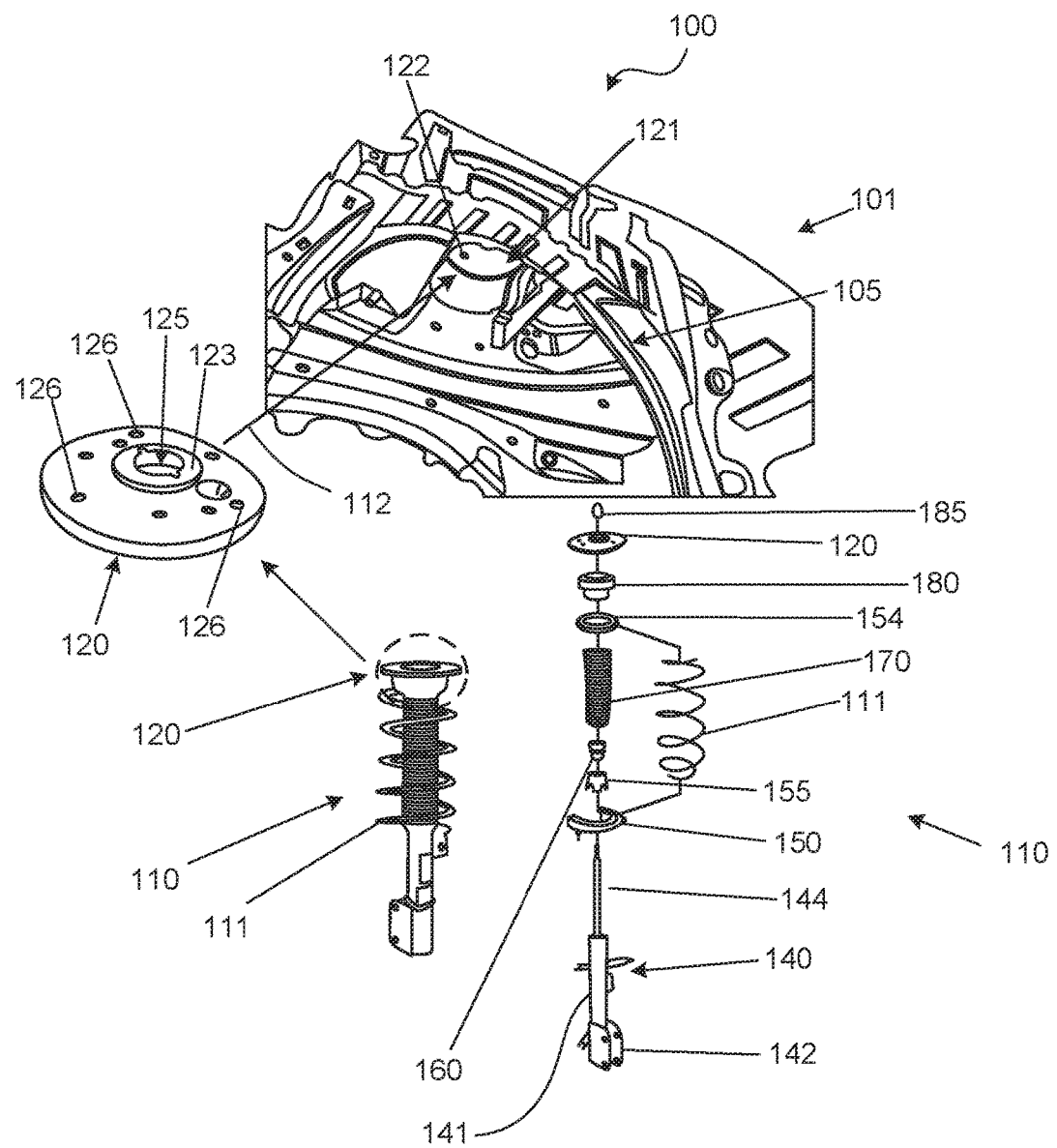
FIG. 1A is a perspective view of a known strut assembly and strut tower.

FIG. 1A shows a perspective view of a known suspension support 100 for a vehicle 101. The suspension support 100 includes a damper tower and, more particularly, a strut tower 105. Adjacent the strut tower 105 is a strut assembly 110, a loaded strut that is completely assembled and ready for installation, which is to be installed in the strut tower 105, as represented by arrow 112. On the left side of FIG. 1A, the strut assembly 110 is shown to include a spring 111 (e.g., a coil spring, an air spring, etc.) and a top mount bushing housing 120 at an upper portion of the strut assembly 110. During installation of the strut assembly 110 in the strut tower 105, whether during assembly of the vehicle 101 or during a subsequent maintenance, the top mount bushing housing 120 is biased against an upwardly extending recess 121 formed in the strut tower 105 to receive the top mount bushing housing 120 from below. Mechanical fasteners (e.g., bolts and nuts, etc.) are used to fasten the top mount bushing housing 120 to the strut tower 105 using through holes 122 formed in the strut tower 105.

FIG. 1A shows an enlarged view of the top mount bushing housing 120 corresponding in configuration to the strut tower 105. A boss 123 is formed in a central portion of the top mount bushing housing 120, the boss 123 defining an aperture 125 therethrough. Through holes 126 (e.g., 2 holes, 3 holes, 4 holes, etc.) are provided in the top mount bushing housing 120 to receive mechanical fasteners used to attach the top mount bushing housing 120 to the strut tower 105. The strut tower 105 includes the through holes 122, which correspond in number and position to the through holes 126 formed in the top mount bushing housing 120 to enable connection of top mount bushing housing 120 to the strut tower 105 via mechanical fasteners.

FIG. 1A also shows an exploded view of the strut assembly 110. The strut assembly 110 includes a strut 140 having a body 141 with a lower mount 142 to connect to the vehicle suspension (e.g., to a steering/suspension knuckle, control arm, etc.) via mechanical fasteners (e.g., bolts and nuts, etc.). A strut piston rod 144 is fixed relative to the top mount bushing housing 120 and is movably disposed relative to the body 141. The strut assembly 110 also includes a lower spring isolator pad 150 provided at a lower end of a spring 111 and an upper spring isolator pad 154 provided on an upper end of the spring 111. The upper spring isolator pad 154 may be integrated with the top mount bushing housing 120.

FIG. 1A shows a bump cap 155, which is provided to protect the oil seal from direct contact with the example jounce bumper 160 during jounce events. The jounce bumper 160, or bump stop, is disposed at a top portion of the body 141 with the strut piston rod 144 passing through an opening through the jounce bumper 160. The jounce bumper 160 yields under compressive loads to provide cushioning for jounce loads. The jounce bumper 160 may include, for example, a compressible material such as, but not limited to, an elastomer, a rubber, a plastic, or a microcell urethane having a spring rate suited for a suspension of the vehicle 101. The jounce bumper 160 is to prevent metal on metal contact when the suspension is significantly compressed, such as after hitting a bump. A sleeve 170 (e.g., a rubber or plastic gaiter, etc.) is disposed about the strut piston rod 144 and the jounce bumper 160, yet within an inner diameter of the spring 111.

Above the upper spring isolator pad 154 on the right side of FIG. 1A is a bearing 180 (e.g., a strut bearing) to facilitate rotation of the strut 140, allowing a rotational degree of freedom for the strut assembly 110 to ensure the spring 111 does not wind/unwind during steering events. FIG. 1A further shows, on the right side of FIG. 1A, the top mount bushing housing 120 disposed above the bearing 180 and a mechanical fastener 185 to fasten together the lower spring isolator pad 150, the spring 111, the upper spring isolator pad 154, the jounce bumper 160, the sleeve 170, and the bearing 180 to form the strut assembly 110.

Figure 1B:
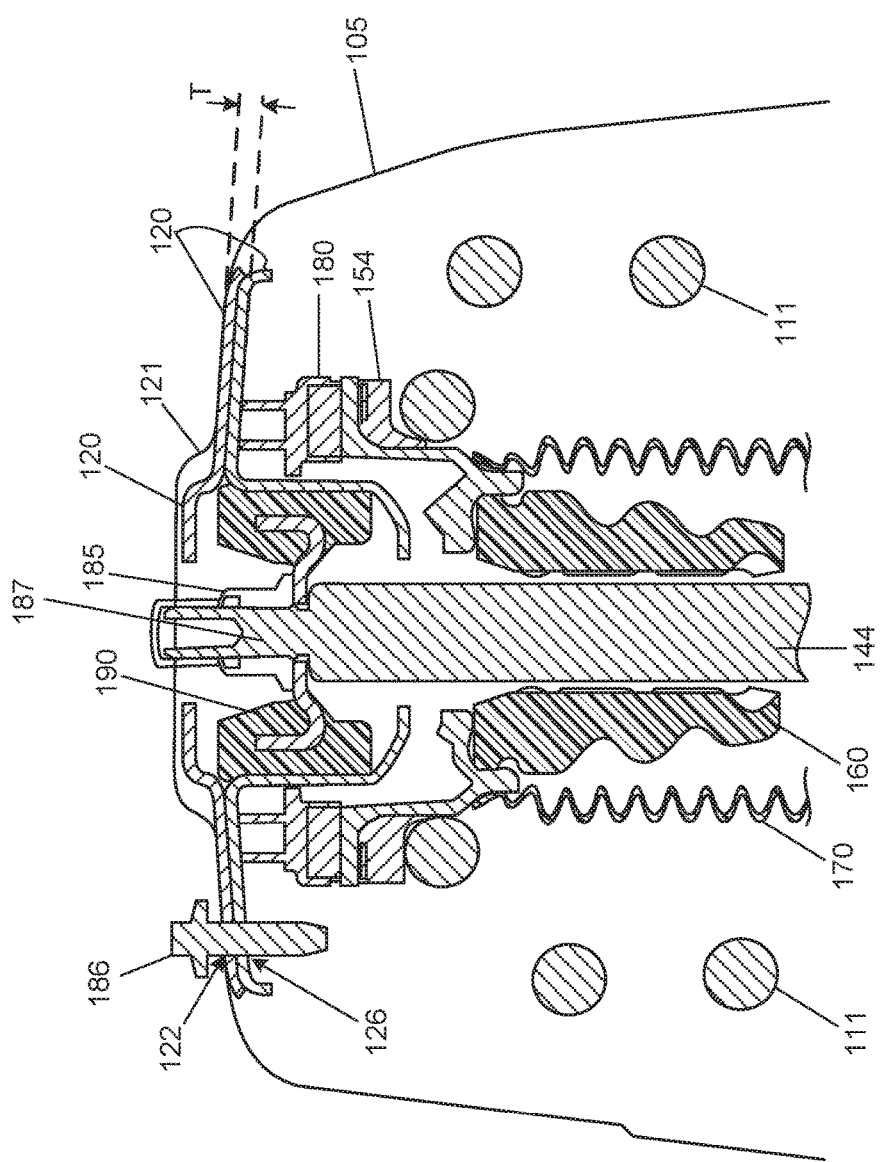
FIG. 1B is an example cross-sectional view of the known strut assembly of FIG. 1A installed in the known strut tower of FIG. 1A.

FIG. 1B is a cross-sectional view of the known strut assembly 110 of FIG. 1A installed in the known strut tower 105 of FIG. 1A. FIG. 1B shows the top mount bushing housing 120 of the strut assembly 110 of FIG. 1A fastened to the upwardly extending recess 121 of the strut tower 105 via mechanical fasteners 186 (e.g., bolts, etc.) disposed through the through holes 126 formed in the top mount bushing housing 120 and the through holes 122 formed in the strut tower 105. FIG. 1B shows the top mount bushing housing 120 in relation to a top mount bushing 190. FIG. 1B also shows that lateral portions of the top mount bushing housing 120 have a thickness (T). The mechanical fastener 185 is shown to secure an upper end 187 of the damper (e.g., strut piston rod 144, etc.) to the top mount bushing 190. FIG. 1B also shows the upper spring isolator pad 154, the spring 111 (e.g., coil spring, etc.) and the jounce bumper 160.

Figure 2A:
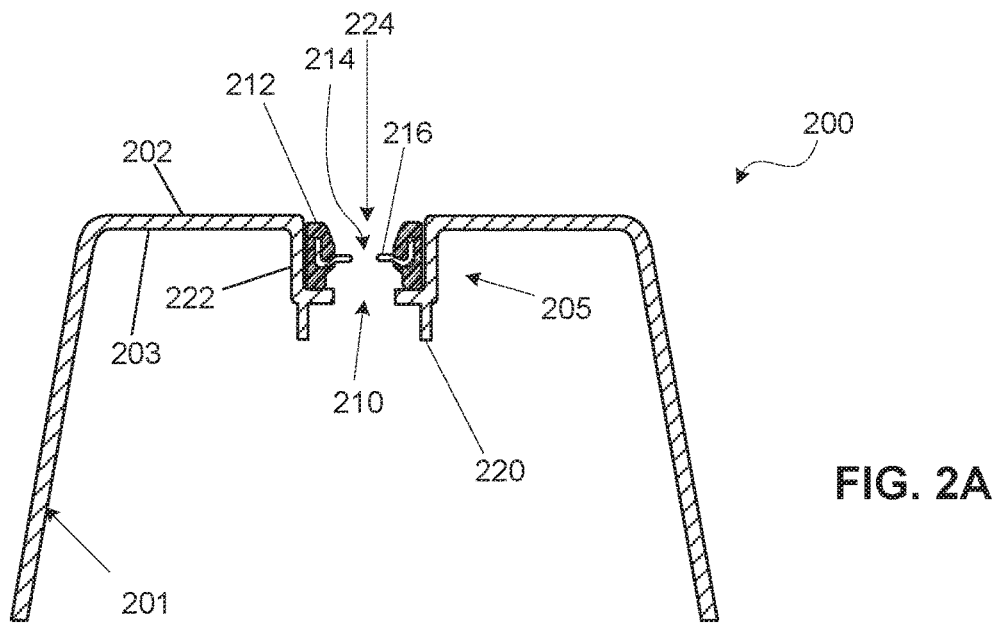
FIG. 2A is an example cross-sectional view of an example implementation of an example vehicle suspension support in accordance with the teachings of this disclosure.

FIG. 2A is a cross-sectional view of an example vehicle suspension support 200 in accordance with the teachings of this disclosure. The vehicle suspension support 200 includes an example housing 201, a damper tower (e.g., a strut tower, a shock absorber tower, etc.) to be connected to a vehicle chassis. The housing 201 includes an example upper surface 202 and an example lower surface 203. The housing 201 includes an example boss 205 extending downwardly into an interior of the housing 201 to receive an upper end of a damper (e.g., piston rod 144, etc.) via an example first opening 210 in a lower portion of the boss 205.

An example top mount bushing 212 is integrated within the boss 205. In some examples, the boss 205 has a depth equal to or greater than a height of the top mount bushing 212 to be received therein. An example aperture 214 of the top mount bushing 212 is aligned (e.g., coaxially aligned, etc.) with the first opening 210. An upper end of a strut or an upper end of a shock absorber may be inserted through the first opening 210 and the aperture 214 to connect to the top mount bushing 212 using a mechanical fastener applied to the upper end of the strut or the shock absorber.

In some examples, the top mount bushing 212 includes an example load bearing plate 216 to retain the upper end of the strut or the shock absorber. In some examples, the load bearing plate 216 includes a metal (e.g., Aluminum, etc.), an alloy (e.g., steel, etc.), or a composite material. In some examples, the load bearing plate 216 is disposed within a damping medium of the top mount bushing 212, which may include, but is not limited to, a low-durometer rubber (e.g., 45 durometer rubber, etc.) or a high-durometer rubber (e.g., 70 durometer rubber, etc.). In some examples, the load bearing plate 216 of the top mount bushing 212 defines the aperture 214 that is aligned with the first opening 210 in the lower portion of the boss 205.

In some examples, the boss 205 includes an example jounce bumper receiver 220 at an exterior, lower portion of the boss 205 to receive a jounce bumper (see, e.g., jounce bumper 160 in FIG. 1A). In some examples, the jounce bumper receiver 220 is an integral part of the boss 205. In some examples, the jounce bumper receiver 220 is mechanically attached to the boss 205. In yet other examples, the jounce bumper receiver 220 is provided in a location of the vehicle separate from the suspension support linking the example strut or the example shock absorber to the chassis. For instance, the jounce bumper receiver 220 may be disposed on the vehicle chassis between a chassis side rail and an axle tube to prevent the bottoming-out of the suspension under full compression.

In FIG. 2A, an example sidewall 222 of the boss 205 has a cylindrical shape defining an example second opening 224 at a top portion of the boss 205. In some examples, a diameter of the second opening 224 corresponds to an inner diameter of the boss 205. The second opening 224 provides access into an interior volume of the boss 205. In some examples, the top mount bushing 212 is disposed in the interior volume of the boss 205 through the second opening 224. The top mount bushing 212 may then be fixed within the interior volume of the boss 205 via, for example, an interference fit.

Figure 2B:
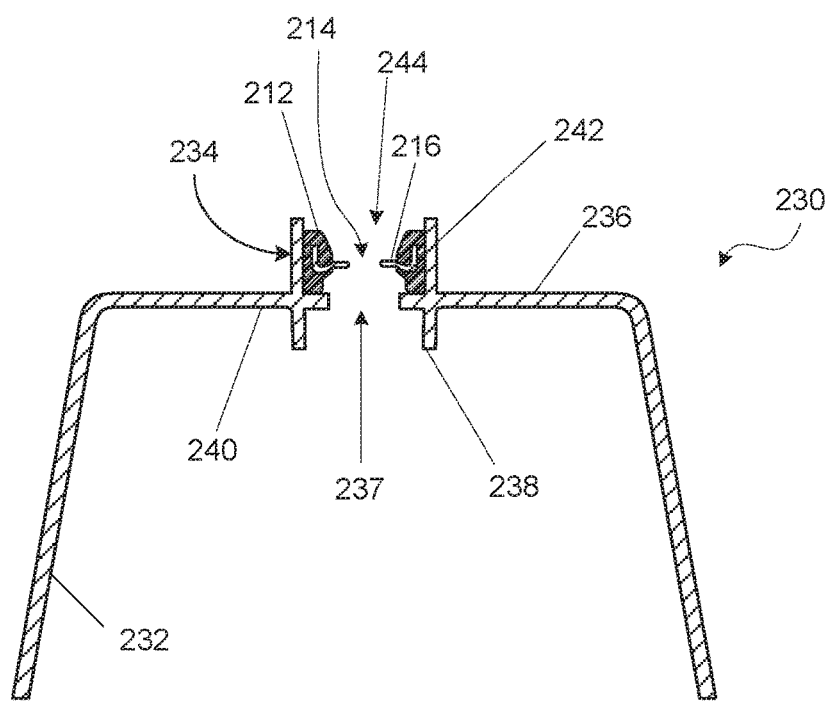
FIG. 2B is an example cross-sectional view of another example implementation of an example vehicle suspension support in accordance with the teachings of this disclosure.

FIG. 2B is an example cross-sectional view of another example vehicle suspension support 230 having an example housing 232 defining a damper tower. The housing 232 is to be connected to a vehicle chassis. In FIG. 2B, the boss 234 is disposed to extend upwardly from an example upper surface 236 of the housing 232. The boss 234 is to receive an upper end of the damper (e.g., piston rod 144, etc.) via a first opening 237 in a lower portion of the boss 234.

The top mount bushing 212 is integrated within the boss 234. In some examples, the boss 234 has a height equal to or greater than a height of the top mount bushing 212 received therein. The aperture 214 of the top mount bushing 212 is aligned with the first opening 237 of the boss 234. An upper end of a strut or an upper end of a shock absorber may be inserted through the first opening 237 and through the aperture 214 to connect to the top mount bushing 212 using a mechanical fastener applied to the upper end of the strut or the shock absorber.

In some examples, the boss 234 includes an example jounce bumper receiver 238 at an exterior, lower portion of the boss 234 to receive a jounce bumper (see, e.g., jounce bumper 160 in FIG. 1A). In some examples, the jounce bumper receiver 238 is an integral part of the boss 234. In some examples, the jounce bumper receiver 238 extends from an example lower surface 240 of the housing 232.

In FIG. 2B, an example sidewall 242 of the boss 234 has a cylindrical shape defining an example second opening 244 at a top portion of the boss 234 to provide access into an interior volume of the boss 234. In some examples, a diameter of the second opening 244 is substantially equal to an inner diameter of the boss 234. In some examples, the top mount bushing 212 is positioned within an interior volume of the boss 234 through the second opening 244 and then fixed within the boss 234 (e.g., via an interference fit, threaded connection, a welded connection, etc.).

Figure 2C:
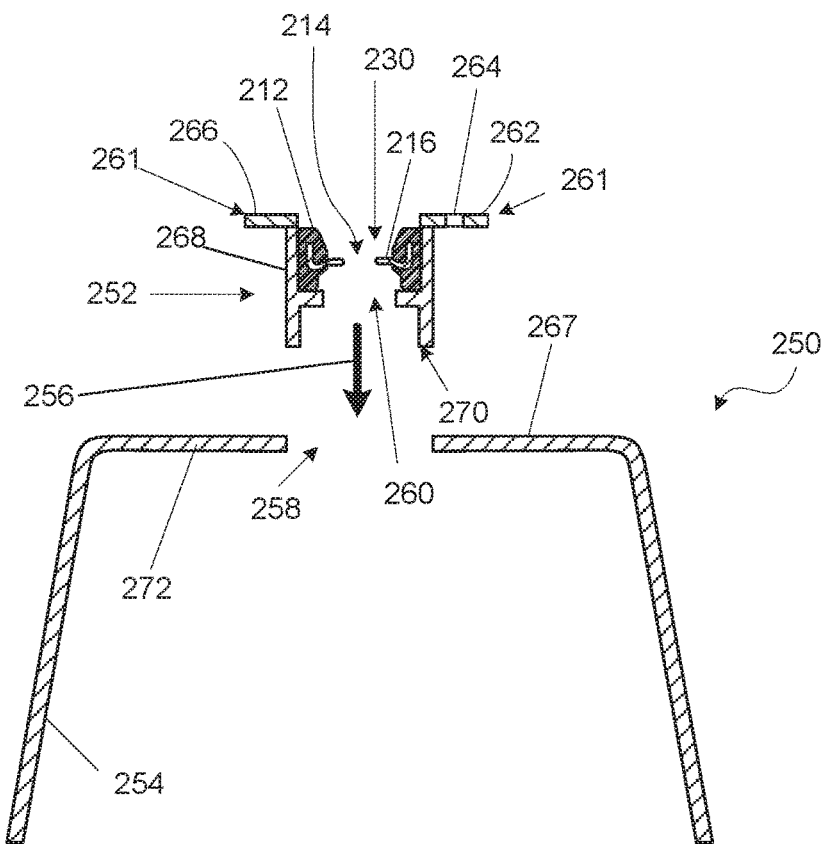
FIG. 2C is an example cross-sectional view of yet another example implementation of an example vehicle suspension support in accordance with the teachings of this disclosure.

FIG. 2C is an example cross-sectional view of another example vehicle suspension support 250 in relation to an example chassis portion 252 and an example housing 254 during manufacture of the vehicle. In FIG. 2C, the chassis portion 252 is disposed above the example housing 254 and is moved toward the housing 254 in the direction of the arrow 256 for insertion through an example opening 258 in the housing 254. Once the chassis portion 252 is inserted through the opening 258 in the housing 254, the chassis portion 252 is then connected to the housing 254.

As with the examples of FIGS. 2A-2B, the top mount bushing 212 of FIG. 2C includes the load bearing plate 216 to retain an upper end of a damper. The chassis portion 252 is to receive an upper end of a damper via an example first opening 260 defined in a bottom portion of the chassis portion 252. The top mount bushing 212 is fixed within the chassis portion 252 with the aperture 214 aligned with the first opening 260.

In some examples, the chassis portion 252 of the vehicle suspension support 250 includes one or more example connectors 261 to connect the chassis portion 252 to the vehicle suspension support 250. In some examples, the connectors 261 may be brackets 262 by which the chassis portion 252 may be fixed to the housing 254 (e.g., a strut tower) via one or more mechanical fasteners (e.g., bolts, etc.) inserted through an example through hole 264 in the bracket(s) 262. In some examples, the connectors 261 may be weld tabs 266 by which the chassis portion 252 may be fixed, via welding, to an upper surface 267 of the housing 254.

In FIG. 2C, an example sidewall 268 of the chassis portion 252 defines a cylindrical shape. In another example, the sidewall 268 of the chassis portion 252 defines a non-cylindrical shape, such as a frustoconical shape. In the example of FIG. 2C, an example jounce bumper receiver 270 extends downwardly from a lower surface of the chassis portion 252 to extend below an example lower surface 272 of the housing 254.

In FIGS. 2A-2C, the upper surfaces 202, 236, 267 and the lower surfaces 203, 240, 272 of an upper portion of the housings 201, 232 and 254, respectively, are shown, for simplicity, to have a substantially level elevation. In some examples, the upper surfaces 202, 236, 267 and/or the lower surfaces 203, 240, 272 of the housings 201, 232 and 254 include one or more elevation changes or contours, across one or more planes, to accommodate a particular vehicle design. For instance, in the examples of FIGS. 2A-2C, a central portion of the upper surfaces 202, 236, 267 may be recessed within the housings 201, 232 and 254, respectively, to extend downwardly into an interior of the respective housing.

Figure 3:
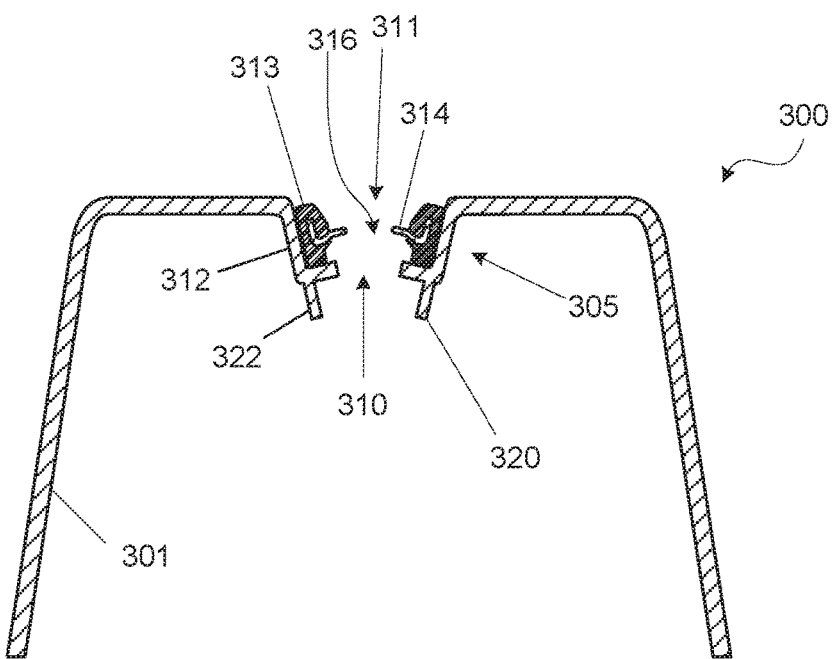
FIG. 3 is an example cross-sectional view of another example implementation of an example vehicle suspension support in accordance with the teachings of this disclosure.

In the example of FIGS. 2A-2C, the sidewalls 222, 242 of the bosses 205, 234 and the sidewall 268 of the chassis portion 252 respectively define an example cylindrical shape and the jounce bumper receivers 220, 238, 270 downwardly depending therefrom also define a cylindrical shape. FIG. 3 shows another example profile of an example vehicle suspension support 300 including an example housing 301 and an example boss 305 formed in the housing 301. The boss 305 defines an example first opening 310 and an example second opening 311, with an example sidewall 312 of the boss 305 further defining a non-cylindrical shape (e.g., a frustoconical shape, a part of a solid intersected between two substantially parallel planes, an oval shape, etc.). An example top mount bushing 313 includes an example bearing plate 314 defining an example aperture 316, the top mount bushing 313 having a peripheral geometry accommodating the non-cylindrical shape of the sidewall 312. In FIG. 3, an example jounce bumper receiver 320 includes an example sidewall 322 defining a non-cylindrical shape. In other examples, the jounce bumper receiver 320 includes a sidewall 322 defining a cylindrical shape downwardly depending from a lower portion of the boss 305.

Figure 4A:
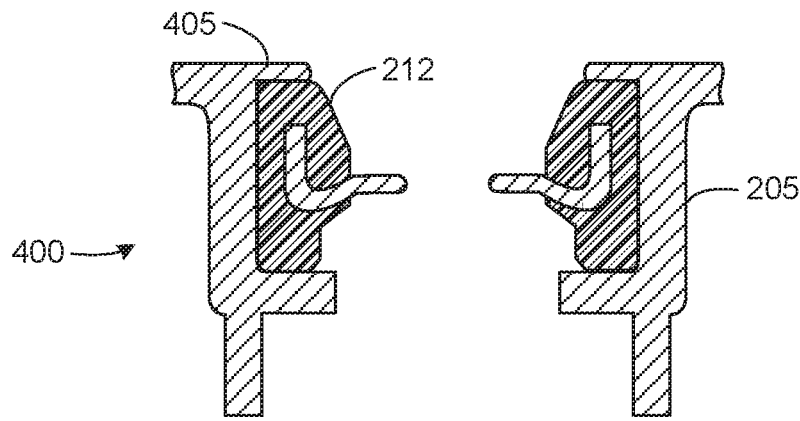
FIG. 4A is an example cross-sectional view of the example vehicle suspension support of FIG. 2, with a first example fixation of the example top mount bushing to the example boss, in accordance with the teachings of this disclosure.
Figure 4B:
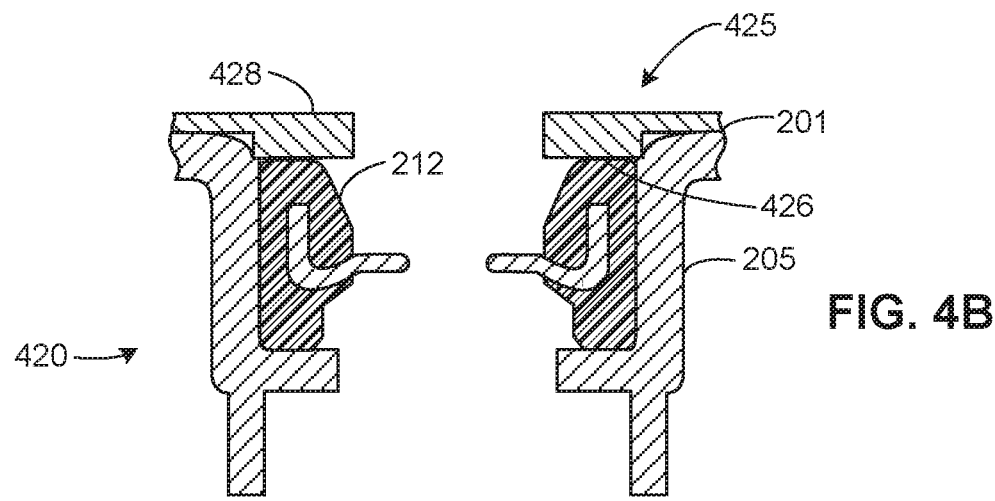
FIG. 4B is an example cross-sectional view of the example vehicle suspension support of FIG. 2, with a second example fixation of the example top mount bushing to the example boss, in accordance with the teachings of this disclosure.
Figure 4C:
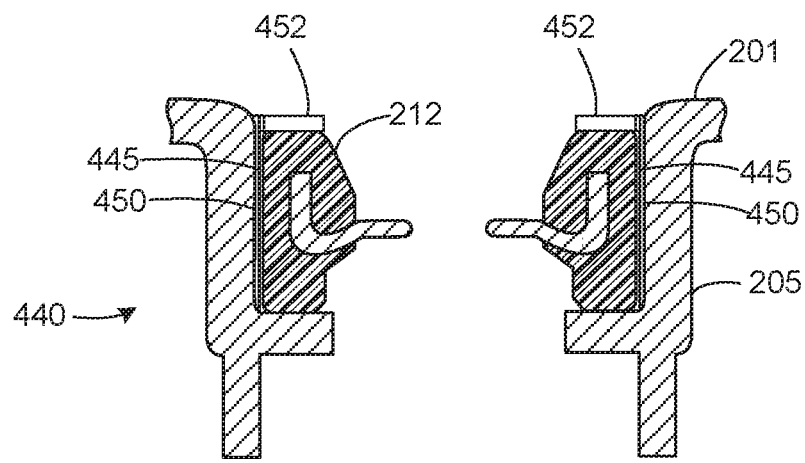
FIG. 4C is an example cross-sectional view of the example vehicle suspension support of FIG. 2, with a third example fixation of the example top mount bushing to the example boss, in accordance with the teachings of this disclosure.

FIGS. 4A-4C show some examples of integration of the top mount bushing 212 of FIG. 2A within the boss 205. Likewise, the examples of integration of the top mount bushing 212 of FIGS. 4A-4C are equally applicable to the boss 234 of FIG. 2B, the chassis portion 252 of FIG. 2C and the boss 305 of FIG. 3.

FIG. 4A is an example cross-sectional view of the vehicle suspension support 200 of FIG. 2A, with a first example manner of fixation 400 of the top mount bushing 212 to the boss 205. In the example of FIG. 4A, an example portion 405 of the housing 201 is physically displaced over a portion of the top mount bushing 212 via a metalworking process such as, but not limited to, an example crimping process, an example swaging process, an example punching process, an example stamping process, an example flaring process, an example roll forming process, or an example clinching process. The portion 405, positioned over the top mount bushing 212, forms a stop against upward axial movement of the top mount bushing 212.

FIG. 4B is an example cross-sectional view of the example vehicle suspension support 200 of FIG. 2A, with a second example manner of fixation 420 of the top mount bushing 212 to the boss 205. In the example of FIG. 4B, an example retainer 425 is physically disposed over a portion of the top mount bushing 212 and attached to the housing 201 or the boss 205 to bias a lower surface 426 of the retainer 425 against an upper surface of the top mount bushing 212 to prevent axial movement of the top mount bushing 212 within the boss 205. In some examples, the retainer 425 includes an example plate 428 attached to the housing 201 via mechanical fasteners (e.g., bolts, etc.), threading (e.g., a mating threaded connection between the plate 428 and the housing 201) or bonding (e.g., a welded connection between the plate 428 and the housing 201, an adhesive connection between the plate 428 and the housing 201, etc.). In some examples, the retainer 425 disposed over the top mount bushing 212 and fixed to the boss 205 or the housing 201 via bars, pins, rivets, tabs or stakes. For instance, bars may be disposed over the top mount bushing 212 and disposed laterally with respect to the aperture 214 to not interfere with an upper end of a strut, an upper end of a shock absorber, or a fastener (e.g., a top nut, etc.) attached thereto. The bars may be fixed to the boss 205 or the housing 201 by mechanical fasteners or bonding. In another example, a plurality of stakes, pins or rivets may be affixed to the housing 201 and/or the boss 205 about a periphery of the top mount bushing 212.

FIG. 4C is an example cross-sectional view of the example vehicle suspension support 200 of FIG. 2A, with a third example manner of fixation 440 of the example top mount bushing 212 to the boss 205. In FIG. 4C, an outer diameter of the top mount bushing 212 includes an example first threaded connection 445 and an inner diameter of the boss 205 includes an example second threaded connection 450 to matingly engaging the first threaded connection 445. Accordingly, the top mount bushing 212 is screwed into the boss 205. A mechanical locking device 452 and/or an adhesive may be used to prevent the top mount bushing 212 from backing out. In some examples, the optional third example manner of fixation 440 may be used in combination with the second example manner of fixation 420 or the first example manner of fixation 400.

Figure 5:
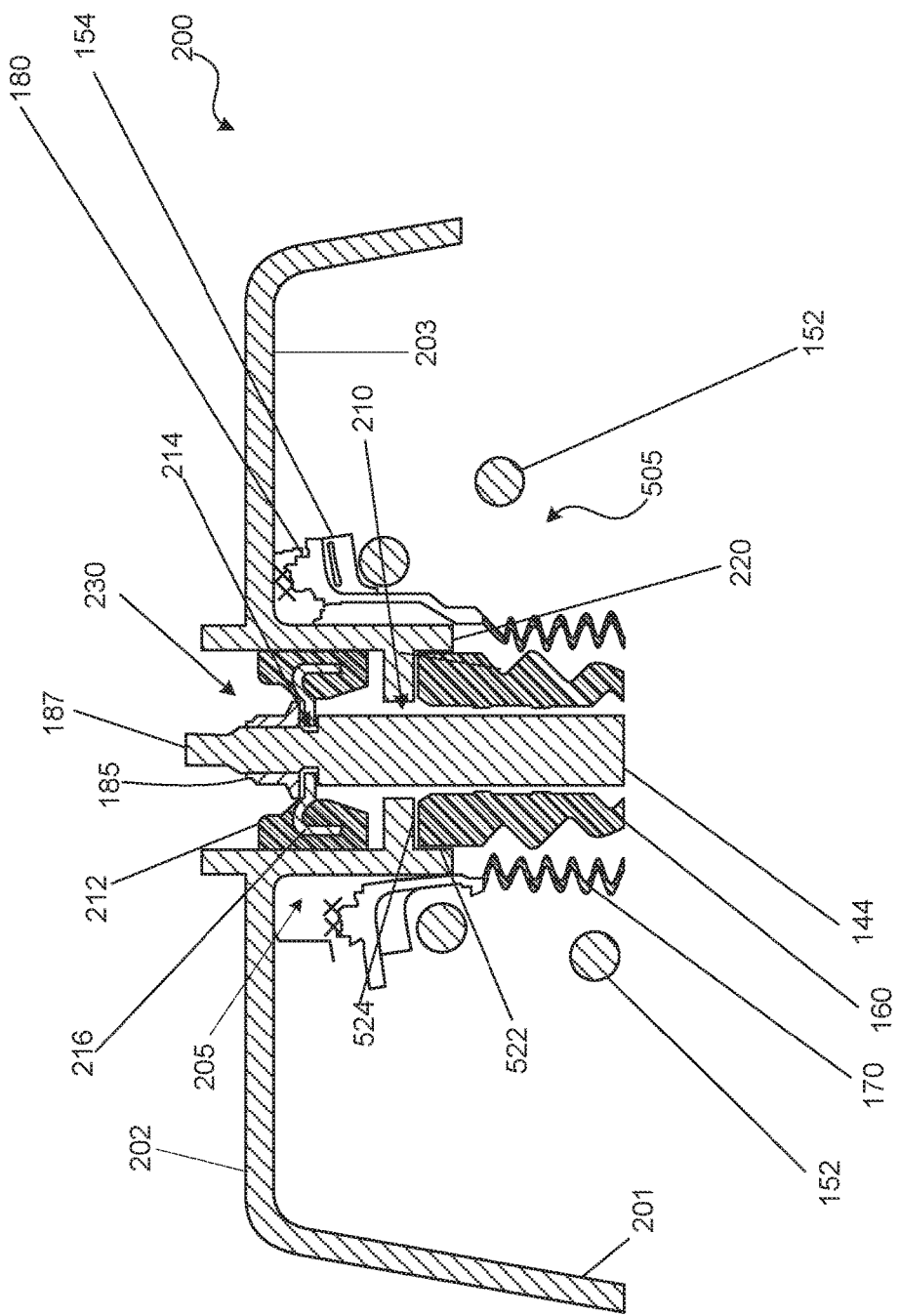
FIG. 5 is an example cross-sectional view showing an assembly of the example implementation of the example vehicle suspension support of FIG. 2 with an example shock absorber or strut, in accordance with the teachings of this disclosure.

FIG. 5 is an example cross-sectional view showing an assembly of the vehicle suspension support 200 of FIG. 2A and an example damper assembly 505 (e.g., a strut assembly, a shock absorber assembly, etc.). In the example of FIG. 5, the damper assembly 505 will be described, by way of example, as a strut assembly. The housing 201 defines the boss 205 in which the top mount bushing 212 is fixed. In this manner, the damper assembly 505 of FIG. 5 advantageously omits the top mount bushing housing 120 of the known strut assembly 110 of FIGS. 1A-1B. Instead, as described in relation to FIGS. 2A-4C, the top mount bushing 212 is fixed within the boss 205 to receive an upper end 187 of the strut piston rod 144 through the opening 210 in the boss 205 and the aperture 214 in the load bearing plate 216. The upper end 187 of the strut piston rod 144 is fixed relative to the top mount bushing 212 via the mechanical fastener 185, such as a top nut, which secures the strut piston rod 144 to the load bearing plate 216.

The top mount bushing 212 is fixed, within the boss 205, to the upper surface 202 of the housing 201 to align the aperture 214 of the top mount bushing 212 with the first opening 210. In the example of FIG. 5, the top mount bushing 212 is fixed within the boss 205 via an interference fit. In other examples, the top mount bushing 212 may be fixed within the boss 205 in a different manner such as is shown, by way of example, in FIGS. 4A-4C.

The boss 205 includes the jounce bumper receiver 220, which extends downwardly from the lower surface 203 of the boss 205. The jounce bumper receiver 220 of FIG. 5 is shown to receive the jounce bumper 160, which is compressed axially responsive to compression of the strut and which imparts radial loads against example lateral surfaces 522 and an example upper surface 524 of the jounce bumper receiver 220. In some examples, the jounce bumper receiver 220 is omitted from the boss 205 and is disposed elsewhere on the vehicle suspension or vehicle chassis. In some examples, it is not necessary for the vehicle suspension support 200 to handle jounce loads and the jounce bumper receiver 220 and the jounce bumper 160 are omitted.

In the example of FIG. 5, the strut bearing 180 is disposed about an exterior, or outer diameter, of the boss 205 to facilitate rotation of the strut housing and to serve as an upper pivot point for the steering. It is to be noted that strut bearings are not a mandatory component in all suspension architectures and it is possible for the upper isolator pad 154 or the spring 111 itself to mate directly to the damper tower (e.g., strut tower 105, etc.). Also disposed about the exterior of the boss 205 is the upper isolator pad 154 to receive the spring 111. A lower end of the spring 111 is received by the lower spring isolator pad 150 (not shown) with the spring 111 being compressed between the upper isolator pad 154 and the lower spring isolator pad 150. It is further to be noted that not all vehicles include lower isolator pads. For instance, some applications add a protective coating or sleeve over the lower spring 111 pigtail so there is no metal to metal contact on the lower spring seat or lower spring isolator pad 150. The sleeve 170 is connected to the upper isolator pad 154 or to the strut bearing 180 and about the strut piston rod 144 and the jounce bumper 160 to protect the components from external contamination and elements.

The disclosure of FIG. 5 is equally applicable to an assembly of the vehicle suspension support 200 of FIG. 2A using a shock absorber tower as the housing 201. In this example, an upper end of a shock assembly is received via the aperture 214 of the top mount bushing 212 and is secured to the load bearing plate 216 via the mechanical fastener 185. In this example, a shock bearing is disposed about the boss 205.

Figure 6:
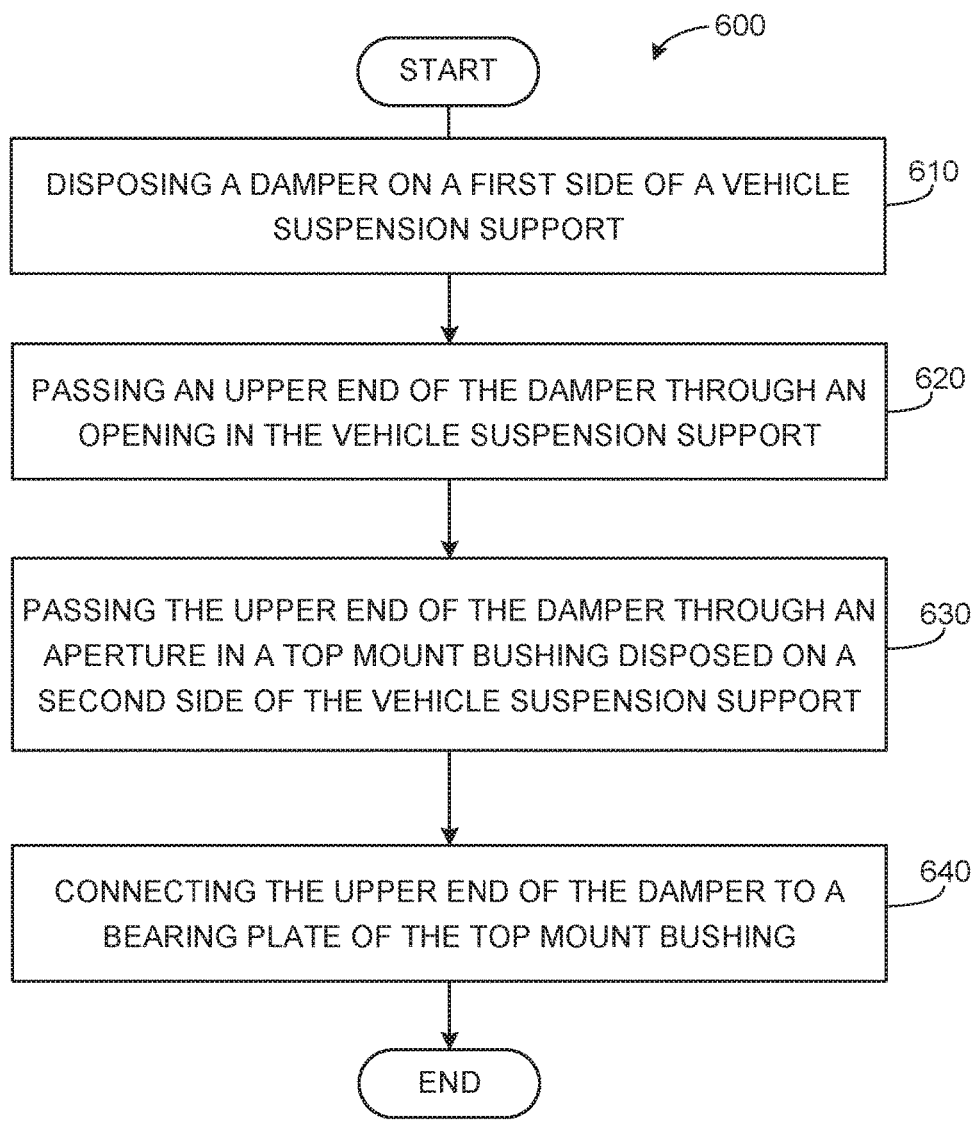
FIG. 6 is a flowchart representative of an example method that may be performed to implement the example vehicle suspension support assembly of FIG. 5, in accordance with the teachings of this disclosure.

A flowchart representative of example method for implementing the assembly of the example vehicle suspension support 200 of FIG. 2A and the example damper assembly 505 shown in FIG. 5 is shown in FIG. 6. In the example of FIG. 6, the method 600 may be a routine implemented by an industrial robot executing machine-readable instructions of one or more programs via an example processor of an example processor platform. In other examples, the method 600 may be implemented by an automotive service technician or a production line worker. In the example of FIG. 6, the method may be implemented using machine readable instructions that comprise a program for execution by a processor to control a device, such as an industrial robot. The program may be embodied in software stored on a non-transitory computer readable storage medium such as a CD-ROM, a floppy disk, a hard drive, a digital versatile disk (DVD), a Blu-ray disk, or a memory associated with a processor, but the entire program and/or parts thereof could alternatively be executed by a device other than a processor and/or embodied in firmware or dedicated hardware. Further, although the example program is described with reference to the flowchart illustrated in FIG. 6, other methods of implementing the method may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example method of FIG. 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

At block 610, the damper assembly 505 (e.g., a strut assembly, a shock absorber assembly, etc.) is disposed on a first side of the vehicle suspension support 200. In some examples, the first side of the vehicle suspension support 200 is a lower side of the housing 201, such as beneath the lower surface 203. For instance, the damper assembly 505 is disposed beneath the lower surface 203 of the housing 201, similar to the indicated placement of the strut assembly 110 relative to the strut tower 105 in FIG. 1A.

At block 620, the upper end 187 of the strut piston rod 144 is passed through the first opening 210 of the vehicle suspension support 200.

At block 630, the upper end 187 of the strut piston rod 144 is passed through the aperture 214 of the top mount bushing 212, which is disposed on a second side of the vehicle suspension support 200. In some examples, the second side of the example housing 201 is an upper side of the example housing 201, such as above the upper surface 202.

At block 640, the upper end 187 of the strut piston rod 144 is connected to the load bearing plate 216 of the top mount bushing 212, such as by using a mechanical fastener 185.

As previously noted, blocks 610, 620, 630 and/or 640 may be performed by a production line worker and/or an industrial robot (e.g., during manufacture, etc.). Blocks 610, 620, 630 and/or 640 may also be performed an automotive service technician, such as during maintenance.

From the foregoing, it will be appreciated that example methods, apparatus and articles of manufacture have been disclosed that provide a new configuration for a vehicle suspension support and a top mount bushing. The disclosed examples enable assembly of the vehicle suspension support and top mount bushing with fewer parts because the example top mount bushing (e.g., 212; FIG. 2A) no longer requires a separate top mount bushing housing (see, e.g., 190; FIG. 1B), resulting in a cost reduction and a weight reduction. Likewise, in accord with at least some examples herein, there is no need for mechanical fasteners to attach the example top mount bushing 212 to the example housing 201 (e.g., strut tower, shock absorber tower, etc.), which again results in a cost reduction and a weight reduction. Further, elimination of the mechanical fasteners (see, e.g., 186; FIG. 1B) to connect the example top mount bushing housing 120 to the example strut tower 105 of FIG. 1A improves wheel alignment. This is due to the intentional oversizing of the body mounting holes. Specifically, of the known assembly of FIG. 1A, the through holes 122, are intentionally oversized compared to the mating mechanical fastener (e.g., 186; FIG. 1B) to allow for ease of assembly and tolerance stack-up within the joint. As a result, wheel alignment can be impacted because it changes the angle of the strut assembly, which cascades to the knuckle and tire. A variation in alignment between the top mount bushing housing 120 and the example strut tower 105 impacts wheel alignment when the vehicle is built and/or serviced. The removal of the alignment interface arising from the elimination of the top mount bushing housing 120 improves wheel alignment control and particularly benefits MacPherson strut suspension architectures.

The elimination of the need for a separate top mount bushing housing 120 in accord with the examples herein also provides an opportunity for improved wheel travel for revised ride performance. In some examples, the top mount bushing housing 120 thickness T (see FIG. 1B) may be between about 4 mm and about 20 mm, or even greater than 20 mm, depending on variables such as the vehicle, original equipment manufacturer, supplier and/or application. In accord with the examples herein, the thickness T of the top mount bushing housing 120 is eliminated to increase the allowable package space. In vehicular applications, a change in available package space of between about 4 mm to about 20 mm is significant, especially for the damper assembly (e.g., strut assembly, shock absorber assembly, etc.), because it increases the available travel to the damper and/or spring without impacting function of the damper and/or spring. The increased travel correspondingly provides greater wheel travel without impacting upper/lower boundary conditions with the body and/or the drive train, which benefits the suspension durability, ride, and handling.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A vehicle suspension support, comprising:
    a strut tower defining a boss, the boss forming a cylindrical recess having a first opening and a second opening opposite the first opening, the cylindrical recess forming an upper surface of the strut tower and the first opening to receive an upper end of a damper; and
    a top mount bushing frictionally engaged with the second opening to be fixed in the cylindrical recess, the top mount bushing having an aperture coaxially aligned with the first and second openings.

2. The vehicle suspension support of claim 1, wherein the top mount bushing includes a bearing plate to secure the upper end of the damper.

3. The vehicle suspension support of claim 1, wherein the cylindrical recess formed by the boss has a depth equal to or greater than a height of the top mount bushing.

4. The vehicle suspension support of claim 1, further including a jounce bumper receiver extending downwardly from a lower surface of the boss.

5. The vehicle suspension support of claim 1, wherein a portion of the strut tower is displaced over the top mount bushing to form a stop to prevent axial movement of the top mount bushing within the boss.

6. The vehicle suspension support of claim 1, further including a retainer connected to the strut tower and biased against an upper surface of the top mount bushing to prevent axial movement of the top mount bushing within the boss.

7. The vehicle suspension support of claim 6, wherein the retainer includes bars, pins, rivets, tabs, stakes or a plate.

8. The vehicle suspension support of claim 1, wherein the damper includes a strut or a shock absorber.

9. The vehicle suspension support of claim 1, wherein the first opening has a first diameter and the second opening has a second diameter, the first diameter less than the second diameter.

10. The vehicle suspension support of claim 1, wherein an outer diameter of the top mount bushing includes a first threaded connection and a surface of the cylindrical recess includes a second threaded connection, the first threaded connection to matingly engage the second threaded connection.

11. A vehicle suspension support, comprising:
    a housing including an opening to receive an upper end of a damper, wherein the housing defines a boss; and
    a top mount bushing fixed to an upper surface of the housing and received by the boss, the top mount bushing having an aperture aligned with the opening, wherein an outer diameter of the top mount bushing includes a first threaded connection, and wherein an inner diameter of the boss includes a second threaded connection, the first threaded connection matingly engaging the second threaded connection.

12. The vehicle suspension support of claim 11, wherein the boss has a depth equal to or greater than a height of the top mount bushing.

13. An apparatus, comprising:
a chassis portion to receive an upper end of a damper via an opening defined in a bottom portion of the chassis portion, an inner diameter of the chassis portion including a first threaded connection;
a top mount bushing fixed within the chassis portion, the top mount bushing having an aperture aligned with the opening, wherein an outer diameter of the top mount bushing includes a second threaded connection to matingly engage the first threaded connection; and
a connector to connect the chassis portion to a vehicle suspension support.

14. The apparatus of claim 13, wherein the connector includes a bracket or a weld tab to fix the chassis portion to the vehicle suspension support.

15. The apparatus of claim 14, wherein the top mount bushing includes a bearing plate to retain the upper end of the damper.

16. The apparatus of claim 15, wherein a sidewall of the chassis portion defines a cylindrical shape.

17. The apparatus of claim 16, further including a jounce bumper receiver extending downwardly from a lower surface of the chassis portion.

18. The apparatus of claim 16, wherein a height of the sidewall of the chassis portion is equal to or greater than a height of the top mount bushing.

19. A method of assembling a vehicle suspension, comprising:
installing a top mount bushing on a first side of a housing that defines a boss, the top mount bushing including a bearing plate defining an aperture aligned with a first opening in the housing, an outer diameter having a first threaded connection, wherein an inner diameter of the boss includes a second threaded connection to matingly engage the first threaded connection;
disposing a damper on a second side of the housing opposite the first side;
passing an upper end of the damper through the first opening and the aperture; and
connecting the upper end of the damper to the bearing plate.

20. The method according to claim 19, wherein the first side of the housing is an upper side of the housing and wherein the second side of the housing is a bottom side of the housing.

* * * * *